United States Patent
Sanchez

(10) Patent No.: US 7,715,833 B2
(45) Date of Patent: May 11, 2010

(54) MOBILE TELEPHONE DEVICE AND DATA-MANAGEMENT METHOD

(75) Inventor: Carlos Portasany Sanchez, Madrid (ES)

(73) Assignee: Vodafone Group PLC (GB)

( * ) Notice: Subject to any disclaimer, the term of this patent is extended or adjusted under 35 U.S.C. 154(b) by 0 days.

(21) Appl. No.: 10/522,859

(22) PCT Filed: Jul. 31, 2003

(86) PCT No.: PCT/ES03/00400

§ 371 (c)(1),
(2), (4) Date: Apr. 27, 2005

(87) PCT Pub. No.: WO2004/014093

PCT Pub. Date: Feb. 12, 2004

(65) Prior Publication Data

US 2005/0176464 A1 Aug. 11, 2005

(30) Foreign Application Priority Data

Jul. 31, 2002 (ES) ................................. 200201810

(51) Int. Cl.
*H04M 3/00* (2006.01)
(52) U.S. Cl. ........................ 455/419; 455/558; 455/420; 455/411; 455/410; 455/556.1; 455/418; 455/407; 455/466
(58) Field of Classification Search .................. 455/558, 455/550.1, 418, 419, 420, 407, 466, 411, 455/566.1
See application file for complete search history.

(56) References Cited

U.S. PATENT DOCUMENTS

| | | | | |
|---|---|---|---|---|
| 5,915,226 A | * | 6/1999 | Martineau | 455/558 |
| 6,216,014 B1 | * | 4/2001 | Proust et al. | 455/558 |
| 6,543,686 B1 | * | 4/2003 | Ritter | 235/380 |
| 6,696,973 B1 | * | 2/2004 | Ritter et al. | 340/825.72 |
| 6,728,553 B1 | * | 4/2004 | Lehmus et al. | 455/558 |
| 6,941,154 B1 | * | 9/2005 | Ritter | 455/550.1 |

(Continued)

*Primary Examiner*—Charles N Appiah
*Assistant Examiner*—Kwasi Karikari
(74) *Attorney, Agent, or Firm*—Ostrolenk Faber LLP

(57) ABSTRACT

A mobile telephony device, comprising:
- a storage device (1) (for example a SIM/USIM card) comprising means for storing at least one application (3A, 4A);
- at least one data array manager module (5) for managing data arrays of at least one application stored in the storage device, comprising means for receiving, by means of a remote access (OTA) message, at least one instruction for operating on at least one piece of data contained in an array of a specified application, means for accessing said array according to said instruction, and means for performing at least one operation on said at least one piece of data in said array, according to said instruction.

The invention also refers to a method for managing data in arrays of applications stored in a card of a mobile telephony subscriber equipment.

15 Claims, 3 Drawing Sheets

U.S. PATENT DOCUMENTS

| | | | |
|---|---|---|---|
| 6,976,171 B1* | 12/2005 | Ritter et al. | 713/193 |
| 6,978,157 B1* | 12/2005 | Amiens | 455/558 |
| 7,363,354 B2* | 4/2008 | Lahti | 709/219 |
| 7,406,332 B1* | 7/2008 | Gaillard et al. | 455/558 |
| 2002/0137545 A1* | 9/2002 | Nachef | 455/558 |
| 2002/0159600 A1* | 10/2002 | Weiner | 380/270 |
| 2003/0055735 A1* | 3/2003 | Cameron et al. | 705/26 |
| 2003/0065738 A1* | 4/2003 | Yang et al. | 709/215 |
| 2004/0131083 A1* | 7/2004 | Arques et al. | 370/469 |
| 2004/0204117 A1* | 10/2004 | Weiner | 455/564 |
| 2005/0026635 A2* | 2/2005 | Michaels et al. | 455/466 |
| 2005/0207562 A1* | 9/2005 | Nachef et al. | 379/357.01 |

* cited by examiner

MOBILE TELEPHONE DEVICE AND DATA-MANAGEMENT METHOD

CROSS REFERENCE TO RELATED APPLICATION

The present application is a 35 U.S.C. 371 national phase conversion of PCT/ES2003/000400 filed Jul. 31, 2003, which claims priority of Spanish Application No. P200201810 filed Jul. 31, 2002. The PCT International Application was published in the Spanish language.

FIELD OF THE INVENTION

The invention is encompassed within the field of mobile telephony. As is known, English acronyms and terms are normally used in said field to refer to elements and concepts pertaining to the field. To facilitate the reading of this specification and for a reader not skilled in the art, a listing of acronyms used herein is set forth below:

| | |
|---|---|
| GSM | Global System for Mobile Communication |
| ICC | Integrated Circuit Card |
| SIM | Subscriber Identity Module |
| SAT | SIM Application Toolkit (or simply "Toolkit Applications"; a set of tools for applications on the SIM) |
| UMTS | Universal Mobile Telecommunications System (also called "Third Generation Mobile Telephony") |
| UICC | UMTS Integrated Circuit Card |
| USIM | Universal Subscriber Identity Module |
| USAT | USIM Application Toolkit (the SAT in the case of UMTS) |
| OTA | Over The Air (Remote access to the SIM/USIM card) |

BACKGROUND OF THE INVENTION

There are currently different types of mobile telephones (also called "portable" or "cellular telephones") which are usually provided with a keyboard and a display with the capacity to show alphanumerical symbols and, in many cases, graphics as well.

There are currently several mobile telephony systems, among them are the GSM and UMTS (also call "Third Generation Mobile Telephony") systems.

The subscriber equipment in the GSM system as well as the UMTS system comprises:

a) on one hand, a terminal (which is what many times is called "mobile telephone") (which includes a casing, display, keyboard, power source and several circuits); and b) on the other hand, an ICC or UICC (UMTS Integrated Circuit Card) card. In the case of GSM, this is an ICC card called SIM card or simply SIM (Subscriber Identity Module), or it is a UICC card with a SIM application, and in the case of UMTS, it will be a UICC with a USIM application. Both the SIM card as well as the UICC card (with one or several SIM and/or USIM applications) contain a set of files with data of the mobile telephony network operator or of the subscriber, and they are provided with means for carrying out operations associated with a series of commands which permit the terminal to access those files (to read them, write them, select them, verify subscriber keys, etc.). The data authenticating the subscriber to the network is contained among the subscriber data.

Until the arrival of UMTS (the so-called Third Generation Mobile Telephony), no distinction was usually made between the physical interface of the application (dependent on the nature of the integrated circuit card ICC) and the application itself: both were called SIM. Third Generation Mobile Telephony (UMTS) introduced the separation of the physical interface and the applications. The physical interface receives the name UICC; it is a platform on which several applications can simultaneously coexist; there can be SIM and/or USIM applications among them. In UMTS, the subscriber identification application receives the name USIM.

An integrated circuit card is considered a physically secure device, i.e. it is a device in which the stored data is protected against third party attacks trying to read them, modify them, delete them or falsify them without permission of the owner of the information.

Reference is occasionally made below to the subscriber identity module as SIM for both GSM and UMTS (i.e. with SIM, reference is also made to a UICC with the corresponding SIM or USIM applications).

In the field of mobile telephony, the SAT=SIM Application Toolkit (in UMTS, USAT=USIM Application Toolkit) concept is known, consisting of a set of tools for SIM applications; reference is made below to an application based on said tools as a "Toolkit application".

At first, mobile terminals were only capable of sending commands to the SIMs, whereas the SIMs were only capable of responding to commands received from the mobile terminal.

An evolution of mobile terminals and SIM cards later occurred, and on one hand, it permits the terminals to send commands to the SIM card as well as to receive commands therefrom, and on the other, it permits the SIM card to respond to commands received from the mobile terminal as well as to send commands thereto. These commands permit the SIM, for example, to request the terminal to send a short message (SM), to make a call, to show the subscriber a list of options, to request data from him/her, etc.

The applications existing in the SIM card capable of sending commands to the mobile terminal are known by the name of SAT (SIM Application Toolkit) applications. In UMTS, they are known by the name of USAT (USIM Application Toolkit) applications. Both of them are generally called Toolkit applications.

Toolkit applications are an optional feature of both SIM cards and UICC cards (with the corresponding applications). High level procedures, command content and command encoding, are specified in the GSM 11.14 standard for GSM and in the 3GPP TS 31.111 standard for UMTS.

The OTA (Over The Air) concept is also known, which refers to the remote access to the SIM (or USIM) card. When the cards initially became available on the market, the operator could not modify anything in them, they were out of its reach. However, it seemed interesting to be able to modify the content of some files in the card, to modify the customization profile and to load or modify Toolkit applications once the card was in possession of the client.

Therefore, card manufacturers began to incorporate OTA (remote access) systems which permitted managing the contents of the card by means of special short messages. Each manufacturer had a proprietary solution incompatible with that of the other manufacturers. Standard specifications have been subsequently generated for carrying out this type of remote OTA modifications (GSM 03.48 and 3GPP 23.048). Based on these specifications, compatible OTA systems which permit file and application management can be implemented.

Work is currently being done to define standards which permit using other types of carriers, not only short messages, to make communications faster and more flexible, these carriers can be GPRS (General Packet Radio Service), Bluetooth, data call, etc.

A multitude of SIM Toolkit applications are being developed in mobile telephony which are intended to be managed remotely by the operator. The problem arises when wanting to remotely access application data, such as the texts it shows, telephone numbers being called or being sent short messages, or any other type of data.

The applications can be loaded remotely following the standards, but the creation of files in a remote manner is not defined, therefore, if the desire is to be able to load an application and for it to contain some type of data, the data must be stored in an array and not in a file so that it can be downloaded remotely in the card. The problem is that remote access (i.e. "via OTA") to the data stored in arrays is not defined in any way.

Therefore, if the intention is to load applications remotely, the data must be stored in arrays and not in files, but the arrays cannot be modified remotely, therefore the data of an application loaded remotely could not be modified remotely. To currently modify one piece of this data, the application must be deleted and completely reloaded with the modified data, losing all the information that the subscriber may have introduced to customize the application.

Having to eliminate and reload the application to modify, for example, a telephone number, makes it necessary to send between 40 to 60 short messages for a typical application (depending on the size of the application) when one short message would suffice if the telephone number to be modified were in a file.

FIG. 1 shows an example of the state of the art: a SIM (or USIM) card 1 contains a remote access manager (OTA manager) 2 comprising a remote application manager module 2A and a remote file manager module 2F. The card 1 also includes a first Toolkit application 3A and a second Toolkit application 4A. The applications can be SAT or USAT. The first Toolkit application 3A is related to (it reads, writes, handles, etc.) data 3D stored in a file 3F. Said file is established during the customization of the card in the factory (arrow "a" in FIG. 1). The second Toolkit application 4A is related to data 4D stored in an array forming part of the application itself.

The card 1 can be managed remotely by means of an OTA system; OTA messages are received in the subscriber equipment and transmitted to the card, where the remote access manager 2 (constituting a Toolkit application in itself takes charge of performing the appropriate operations. The applications 3A (arrow "b") and 4A (arrow "c") can be loaded in the card by means of the remote application manager module 2A, and if the file 3F has been established in the factory during the customization of the card, the data 3D can be written, read or manipulated remotely (OTA) by means of the file manager module (2F) (arrow "d"). (However, if the file 3F was not created during said customization in the factory, it will not be possible to correctly load the first Toolkit application 3A, since the associated file 3F cannot be created remotely (OTA)).

On the other hand, with regard to the second Toolkit application 4A, the current remote access (OTA) system permits loading the application correctly even though it does not have an associated file, since the application does not require a file: as indicated, the data 4D is stored in an array in the application itself. However, the current remote access (OTA) system for accessing the card does not permit modifying the data 4D associated to said application remotely, since the remote access system (including the remote access manager 2) does not comprise means for accessing and manipulating data in one array of one application. Therefore, to modify any data 4D, it would be necessary to delete the entire application 4A and reload it through the application manager module 2A, with the drawbacks this entails.

DESCRIPTION OF THE INVENTION

A first aspect of the invention refers to a mobile telephony device (which can be a SIM/USIM card or a subscriber equipment comprising a terminal and said SIM/USIM card), comprising:
  a storage device (for example, an integrated circuit card (ICC) with a subscriber identity module (SIM/USIM) comprising means for storing at least one application (for example a SAT/USAT application); and
  means for remote access (OTA) management of the storage device based on remote access (OTA) message reception by mobile telephony (i.e. the means mentioned in the foregoing, including, for example, a remote access manager—OTA manager—with its application manager and file manager and the different carriers which can be used for making the remote access messages reach the card, such as short messages, data calls, GPRS, Bluetooth, etc).

According to the invention, the device also comprises at least one data array manager module for managing data arrays of at least one application stored in the storage device. The data array manager module comprises:
  means for receiving, by means of a remote access (OTA) message, at least one instruction for operating on at least one piece of data contained in an array of a specified application.
  means for accessing said array according to said instruction; and
  means for performing at least one operation on said at least one piece of data in said array, according to said instruction.

The data array manager module is responsible for processing the data or instructions received in an OTA message, for accessing the array and for modifying it according to the instructions.

From the functional point of view, the system can be made up of the following elements:
  A GSM, UMTS card or the like, in which there is a module (either an API (Application Programming Interface) or an independent application) responsible for the OTA array management.
  A terminal supporting SAT or USAT supporting Data Download (more and more models support it—many Siemens, Nokia, Samsung, Alcatel, etc., models) and/or which is class "e", i.e. it supports the channel management commands (there are currently few terminals which support it, but the number of those that do is increasing).
  An OTA server with the associated systems.

The array manager module has a suitable interface so that it can access the arrays of the different applications.

The means for accessing the array can comprise:
means for asking the specified application for a reference of the array;
means for receiving the requested reference; and
means for accessing the array based on said reference.

The data array manager module can be configured to be able to access arrays of a plurality of applications. For example, the module can consist of an independent application capable of accessing the arrays of a plurality of applications.

However, it is also possible to use a specific manager module for each application in which the intention is to operate on data in an array by means of remote access (OTA). For example, the manager module can be part of the specific application, the data array of which is to be accessed, for example, it may be constituted of an API (Application Programming Interface).

The means for remote access (OTA) management can be based on the GSM 03.48 standard or on the 3GPP 23.048 standard.

The device preferably comprises a terminal supporting SAT or USAT and supporting Data Download, and/or a class "e" terminal supporting the SIM Toolkit commands for channel management.

Another aspect of the invention refers to a method for managing data in arrays of applications stored in a card (for example, in a SIM/USIM card) of a mobile telephony subscriber equipment, and comprising the steps of:
receiving a message from a remote access (OTA) server, with at least one instruction regarding at least one piece of data in one array of one application stored in the card;
analyzing the instruction;
accessing the array based on the instruction;
operating on said at least one piece of data in the array based on the instruction;

The step for accessing the array can comprise the steps of:
asking the application for a reference of the array;
receiving said reference; and
accessing the array based on said reference.

The message is preferably received in a terminal of the subscriber equipment and is sent from the terminal to the card, where a remote access (OTA) manager module in the card forwards the instruction to a data array manager module identified in the message. The message is preferably of the Data Download type and is sent to the card by means of the ENVELOPE command. The instruction can be forwarded to a data array manager module identified by means of the TAR field of the message. It is also possible to send the message to the card through a Bearer Independent Protocol-based channel.

A service requiring the modification of data in an application downloaded remotely (or not) in the card can use this system. The module managing the arrays must be capable of identifying different commands to permit a more flexible management of the arrays. It is interesting to use commands which permit at least:
Writing
Reading
Other commands can be added to the former, such as:
Deleting
Copying
Increasing A good option is that of supporting the same commands specified in the GSM 11.11 standard and/or in the 3GPP 31.101 standard for file management:
UPDATE BINARY
UPDATE RECORD
READ BINARY
READ RECORD
INCREASE This permits flexible management of the arrays with a minimum code size.

BRIEF DESCRIPTION OF THE DRAWINGS

A series of drawings which help to better understand the invention and which are expressly related to one embodiment of said invention, presented as an illustrative and non-limiting example thereof, is very briefly described below.

DESCRIPTION OF A PREFERRED EMBODIMENT OF THE INVENTION

Figure 1:
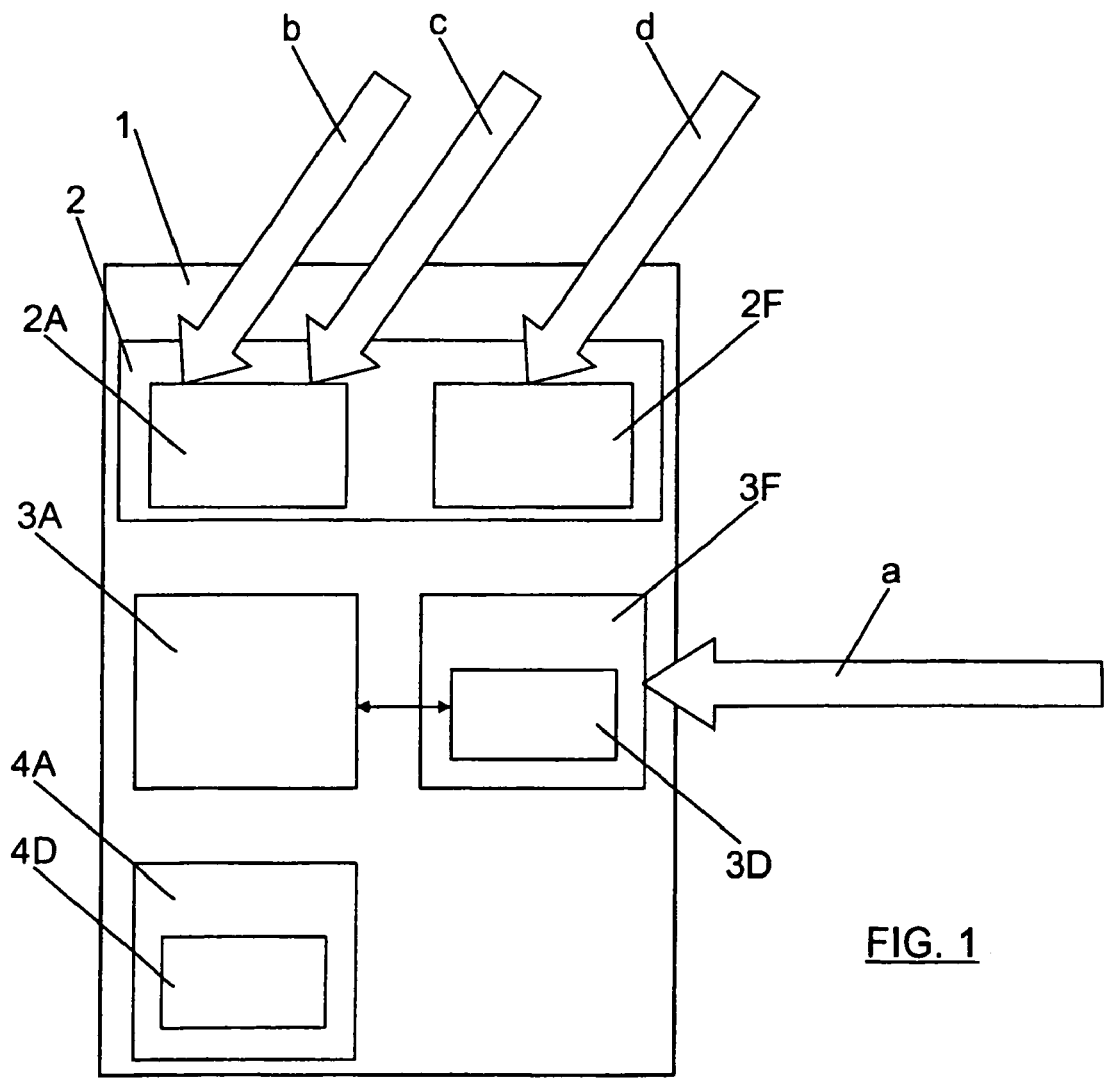
FIG. 1 schematically shows some components of a SIM/USIM card according to the state of the art.
Figure 2:
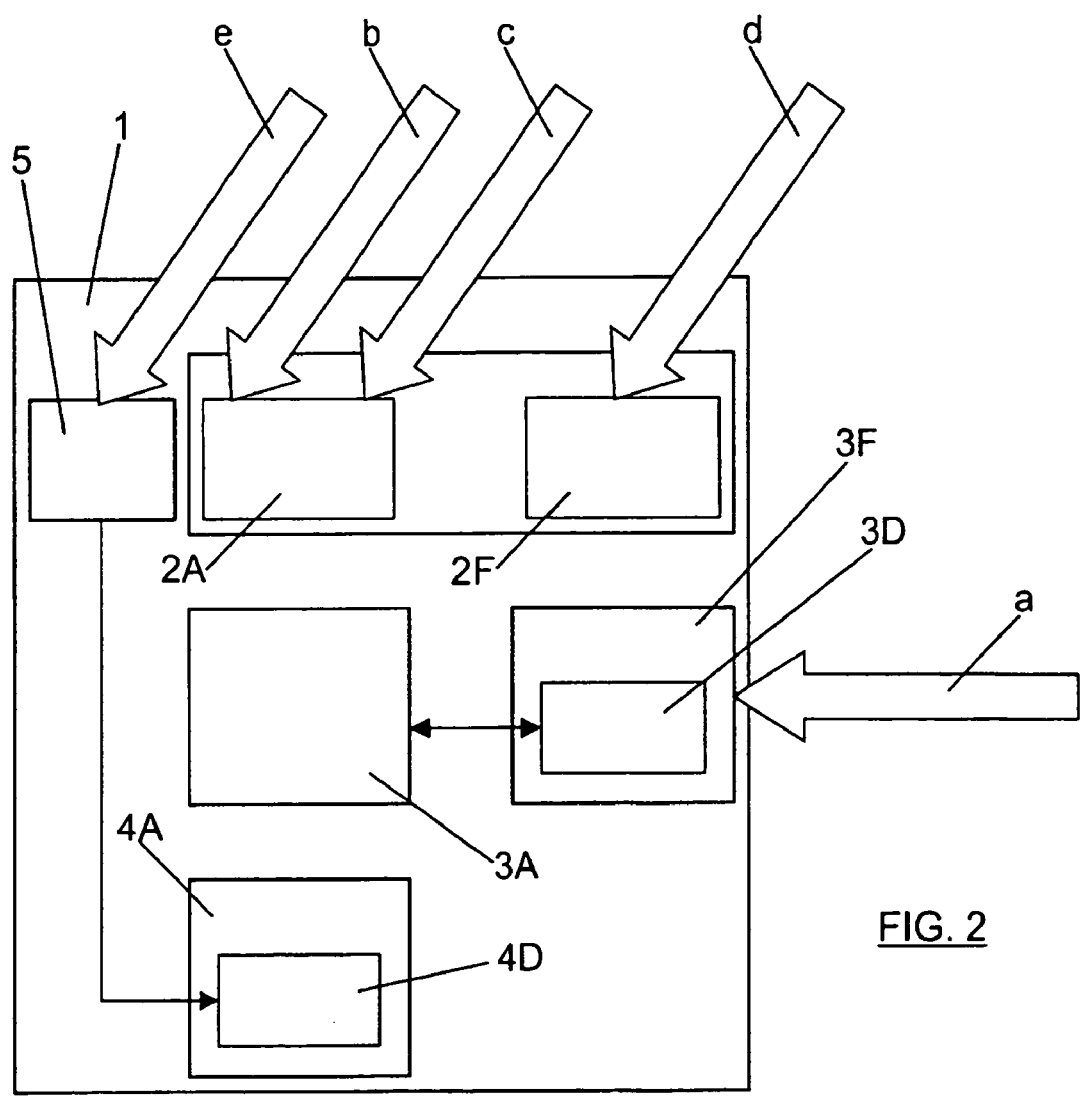
FIG. 2 schematically shows some components of a SIM/USIM card including a data array manager module, according to the invention.

Similarly to FIG. 1, FIG. 2 shows (most of the components can be identical to those of FIG. 1 and have been indicated with the same numerical references for greater clarity) a SIM (or USIM) card 1 containing a remote access (OTA) manager 2 comprising a remote application manager module 2A and a remote file manager module 2F. The card 1 also includes a first Toolkit application 3A (SAT or USAT) and a second Toolkit application 4A (SAT or USAT). The first Toolkit application 3A is related to (reads, writes, manipulates, etc.) data 3D stored in a file 3F. Said file was established during the customization of the card in the factory (arrow "a" in FIG. 2). The second Toolkit application 4A is related to data 4D stored in an array forming part of the application itself.

The card 1 can be managed remotely by means of a remote access (OTA) system; the OTA messages are received in the subscriber equipment and transmitted to the card, where the remote access manager 2 takes charge of performing the appropriate operations. By means of the remote application manager module 2A, the applications 3A (arrow "b") and 4A (arrow "c") can be loaded in the card 1, and since the file 3F was established in the factory during the customization of the card, the data 3D can be written, read or manipulated remotely (OTA) by means of the file manager module (2F) (arrow "d").

On the other hand and according to the invention, the card 1 contains a data array manager module 5 comprising: means for receiving, by means of a remote access (OTA) message, at least one instruction for operating on at least one piece of data contained in an array of a specified application (arrow "e" in FIG. 2); means for accessing said array according to said instruction; and means for performing at least one operation on said at least one piece of data in said array, according to said instruction. Therefore, the data array manager module permits operating on the data 4D in the second Toolkit application 4A, without the necessity of deleting and re-writing the entire application in the memory of the card.

Figure 3:
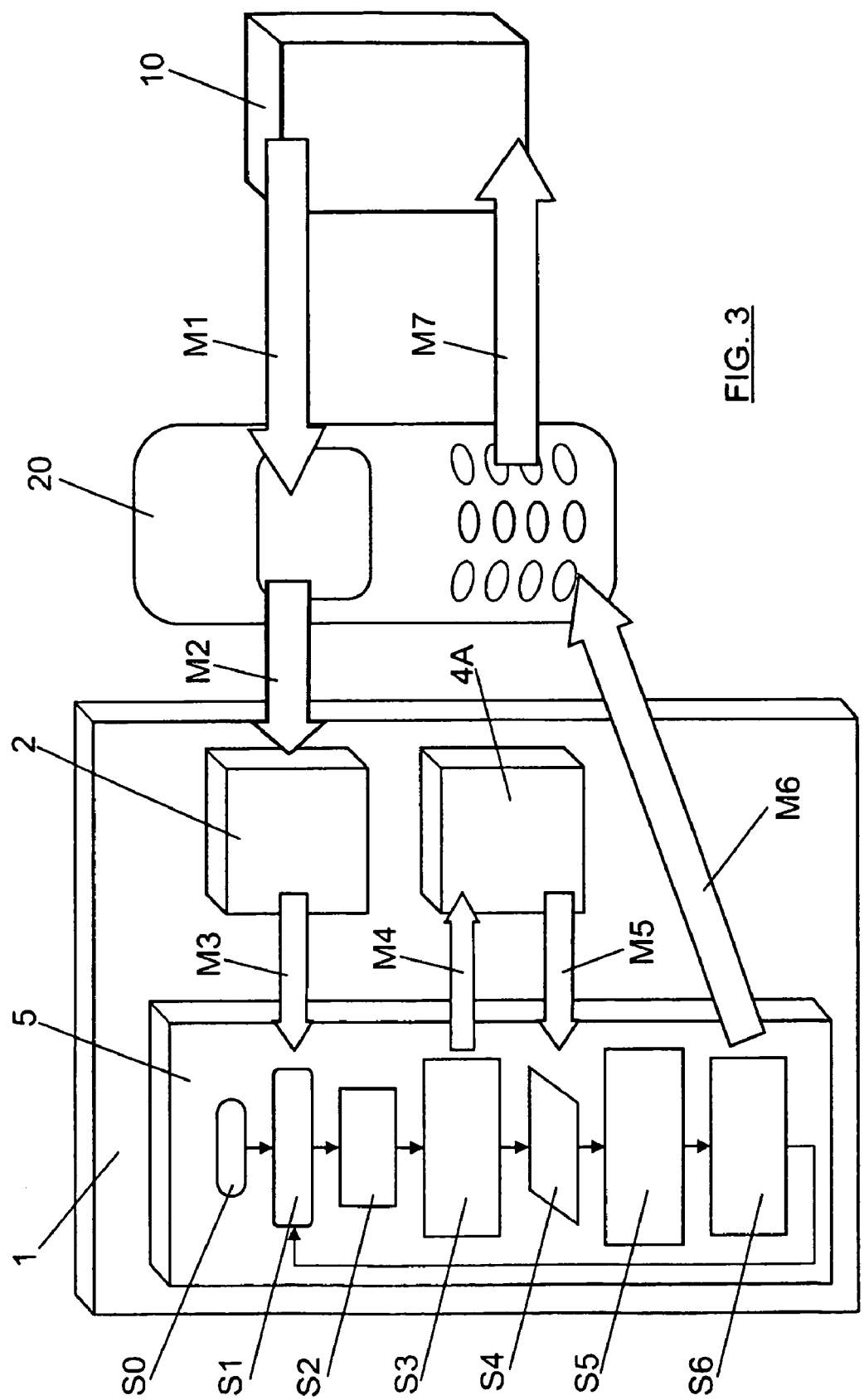
FIG. 3 schematically shows a system comprising a device and operating according to the invention.

FIG. 3 shows a preferred embodiment of the invention, wherein the array manager module 5 consists of an independent application, which can entail an advantage over the alternative which consists of each application managing its own arrays. The advantage consists of the fact that all the messages reaching the Array Manager (the array manager module 5) will be processed as array management messages, whereas in the other solution, in which each application manages its own arrays, it is necessary to distinguish between array management messages and other types of messages which the application may receive for normal operation thereof.

FIG. 3 shows the following process:

The remote access OTA server 10 sends a Data Download-type message M1 to a mobile telephone.

The mobile telephone terminal 20 of the subscriber equipment receives the message and sends it to the SIM/USIM card 1 by means of the ENVELOPE command M2.

The corresponding remote access manager (OTA manager) 2 of the card 1 unpacks the message (it deciphers it, verifies the checksum, etc.) and sends it to the application (to the data array manager module 5) indicated in the TAR field of the message by means of the message M3 comprising instructions relative to the operation which must be performed on the data of the application 4A.

The data array manager module 5 receives the instructions (data, commands) where the array to be modified is indicated by means of the AID of the application and the identification number of the array which is assigned during programming.

The following procedure, shown in FIG. 3, is carried out in the data array manager module 5:

From "start" (S0), the procedure passes to an instruction stand-by state S1. Once the instructions are received, the manager module analyzes the instructions (step S2), and then makes a call M4 to the application 4A requesting a reference to the array (step S3).

The proprietary application 4A of the array in question sends a reference to the array to the data array manager module (5) by means of a message M5. The data array manager module (5) receives said reference (step S4).

Next (step S5), the Array Manager proceeds to write, read or whatever corresponds for it to do.

Then (step S6) it sends a message to the OTA Server indicating the result of the operation, preferably, a short message (SM) using the short message service (SMS) of the system (M6+M7).

The commands supported for file management indicated in the GSM 11.11 and 3GPP 31.101 standards can be used.

Additionally, the SELECT by AID command based on (although it will not be equal because no outgoing data is expected to be received) the 3GPP 31.101 standard to indicate the proprietary application of the array and the SELECT command to select the array can be used.

The status codes can be the same as those specified in the corresponding standards for the respective commands.

Thus, the Data Download message is a concatenation of commands as follows:
SELECT by AID: to indicate the application
SELECT: to indicate the array
UPDATE BINARY, UPDATE RECORD, etc.: to modify the array.

The response will be the concatenation of the status codes, for example, in a correct case, it would be:
90 00: Application selected correctly
90 00: Array selected correctly
90 00: Correct writing The arrays can be identified for their selection by two bytes, as indicated below:

Byte 1: encodes the array structure. The encoding is the same as that defined for files in GSM 11.11, that is:
00 Binary
01 Fixed linear
03 Cyclical Byte 2: identifies the array. The arrays will be registered in the application with sequential numbers beginning with 00.

For example:
If the intention is to manage the array 03 as fixed linear, its identification will be:
01 03
And it will be selected with the command:
A0 A4 00 00 02 01 03
The result of the selection will be:
90 00

Throughout the present description and claims, the word "comprises" and variations thereof, such as "comprising", are not meant to exclude other steps or components.

The invention claimed is:

1. A mobile telephone device, comprising:
an integrated circuit card with a subscriber identity module or a universal subscriber identity module, said card comprising a storage operable for storing at least one application;
a device operable for remote access management of the card based on remote access message reception by mobile telephony;
at least one data array manager module for managing data arrays of at least one application stored in the card, said at least one data array manager module comprising:
a receiver operable to receive, by means of a remote access message received by mobile telephony, at least one instruction for operating on at least one piece of data contained in an array contained in a specified application;
an analyzer operable for analyzing said at least one instruction;
an accessing device operable for accessing said array according to said at least one instruction, said accessing device further comprising
a receiver operable for receiving from the specified application a requested reference for said array;
the accessing device being operable for accessing said array based on said reference; and,
apparatus operable for performing at least one operation on said at least one piece of data in said array, according to said at least one instruction, without the necessity of deleting and rewriting the entire specified application stored in the card.

2. The device according to claim 1, characterized in that said accessing device further comprises:
a device operable for asking the specified application for said reference of said array.

3. The device according to claim 1, wherein said specified application is a SIM Application Toolkit or a Universal SIM Application Toolkit application.

4. The device according to claim 1, wherein said data array manager module is configured to be able to access arrays of a plurality of said applications.

5. The device according to claim 1, wherein said data array manager module is part of said specific application having said data array to be accessed by said data array manager module.

6. The device according to claim 5, wherein said data array manager module is an Application Programming Interface.

7. The device according to claim 1, wherein said device operable for remote access management is based on a GSM 03.48 standard or on a 3GPP 23.048 standard.

8. The device according to claim 3, further comprising a terminal supporting said Subscribe Identity Module (SIM) Application Toolkit or said Universal SIM Application Toolkit and also at least one of a supporting Data Download, and a class "e" terminal supporting the SIM Toolkit commands for channel management.

9. A method for managing data in arrays of applications stored in an integrated circuit card of a mobile telephony subscriber equipment, said card storing a subscriber identity module or a universal subscriber identity module, the method comprising the steps of:
receiving a message from a remote access server by mobile telephony, the message including at least one instruction regarding at least one piece of data in one array contained in one application stored in the card;

analyzing the at least one instruction;

accessing the array, which further comprises the steps of:

receiving from the application a requested reference for said array; and accessing the array based on said reference;

operating on said at least one piece of data in said array based on the at least one instruction, without the necessity of deleting and rewriting the entire application stored in the card.

10. The method according to claim 9, wherein said step of analyzing the at least one instruction is followed by the step of:

asking the application for a reference of the array.

11. The method according to claim 9, further comprising receiving said message in a terminal of subscriber equipment; sending said message from said terminal to the card;

forwarding the at least one instruction via a remote access manager module in the card to a data array manager module identified in the message.

12. The method according to claim 11, wherein the message is of the Data Download type.

13. The method according to claim 12, further comprising sending said message to the card by an ENVELOPE command.

14. The method according to claim 11, wherein the message is sent to the card through a Bearer Independent Protocol-based channel.

15. The method according to claim 13, wherein the at least one instruction is forwarded to a data array manager module identified by a Toolkit Application Reference field of the message.

* * * * *